United States Patent [19]

Tinder et al.

[11] 4,026,473
[45] May 31, 1977

[54] HEADLAMP CLEANING ASSEMBLY

[75] Inventors: David V. Tinder, Madison Heights; Walter E. Mack, Livonia, both of Mich.

[73] Assignee: McCord Corporation, Detroit, Mich.

[22] Filed: Oct. 20, 1975

[21] Appl. No.: 623,798

[52] U.S. Cl. .............................. 239/229; 134/179; 134/180; 239/261; 239/265; 239/284 R; 239/283

[51] Int. Cl.² ...................... B05B 1/10; B05B 3/14; B08B 3/02

[58] Field of Search .......... 239/229, 255, 261, 264, 239/265, 273, 275, 282, 283, 284, 280; 15/250, 250.13, 250.29, 250.31; 248/65, 74 B; 134/172, 176, 179, 180

[56] References Cited

UNITED STATES PATENTS

| | | | |
|---|---|---|---|
| 2,417,222 | 3/1947 | Stine | 239/229 |
| 3,117,727 | 1/1964 | Pollock et al. | 239/284 X |
| 3,127,116 | 3/1964 | Pollock et al. | 239/284 X |
| 3,656,691 | 4/1972 | Norstrand | 239/284 |

FOREIGN PATENTS OR APPLICATIONS 243,604  11/1962  Australia .......................... 239/275

*Primary Examiner*—Evon C. Blunk
*Assistant Examiner*—Andres Kashnikow
*Attorney, Agent, or Firm*—McGlynn and Milton

[57] ABSTRACT

An assembly for directing a fluid, such as a combination of air and a liquid, toward a vehicle headlamp for cleaning the headlamp surface. A box-like support member is adapted at a first end to be connected to a vehicle body adjacent a headlamp and extends to a distal end to be positioned forwardly of the headlamp. The distal end of the box member includes a front wall with an aperture therein to define retaining flanges. An elbow member having a fluid inlet is disposed within the box member and has support flanges which overlap and engage the retaining flanges of the box-like member. A supply tube is connected to the inlet of the elbow and a coil spring is disposed about the supply tube and engaging the elbow member urging the elbow member forwardly. The elbow member has an outlet which extends upwardly and rearwardly from the inlet and a flailing flexible tube is connected to the outlet and has a loop integral therewith extending about the bottom of the elbow member for retaining the flailing tube thereon. A cover member is disposed about the elbow and the flailing tube and a pair of fasteners extend through the cover member to engage a clip disposed about the support flanges of the elbow member whereby the cover is connected to the elbow member and may move therewith by compressing the coil spring. The cover member has a front face which extends upwardly and rearwardly in the direction of a headlamp and the upper end of the cover member defines an opening of generally funnel shape for restricting the flailing movement of the emitting end of the flailing tube. Any one of various adapter plates having one of various configurations may be disposed between the box member and a vehicle body for accommodating the contour of a particular vehicle body to position the assembly so that the flailing tube will be aimed at an adjacent headlamp.

11 Claims, 5 Drawing Figures

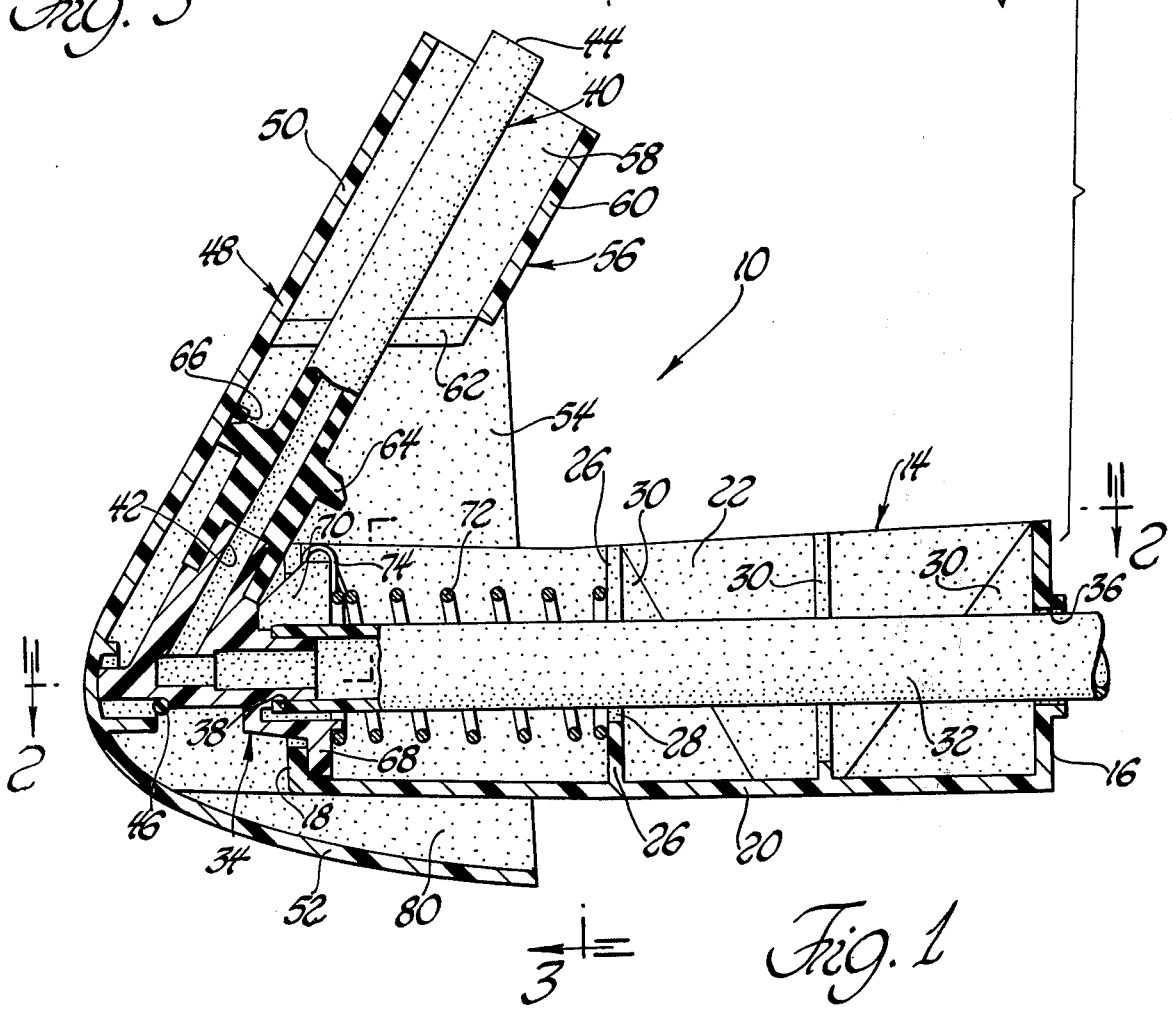

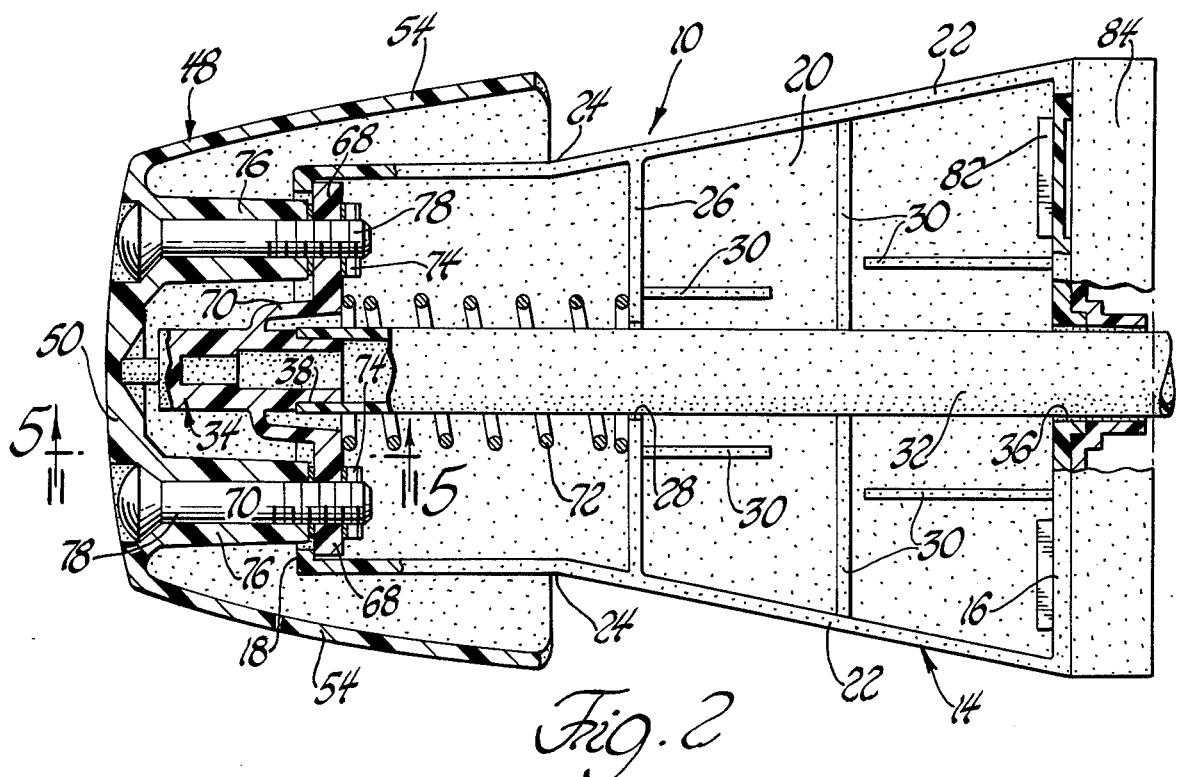

HEADLAMP CLEANING ASSEMBLY

The subject invention relates to a headlamp cleaning assembly of the type for cleaning vehicle headlamps. More specifically, the subject invention relates to a cleaning system of the type utilizing a nozzle defined by a flexible tube having a free end for emitting a high velocity fluid mixture of air and liquid. The tube is anchored at a point spaced from its emitting end and a high velocity fluid mixture of air and liquid is supplied to the tube whereby the end of the tube will flail. The emitting end of the flailing tube is restricted in its movement whereby the emitting end of the tube moves between predetermined limits. Such an assembly is disclosed in co-pending application Ser. No. 550,542 filed Feb. 18, 1975 in the name of John D. Vogel and assigned to the assignee of the subject invention, now abandoned.

In accordance with the subject invention, there is provided a flailing tube assembly which meets manufacturing requirements yet may be easily assembled for installation and disassembled for maintenance such as the replacement of the flailing tube. The assembly includes a support means adapted at a first end to be connected to a vehicle body adjacent the headlamp of the vehicle and extends to a second distal end to be positioned forwardly of the headlamp. A cage means extends from the distal end and in a direction transverse to the support means. A fluid supply means extends through the support means to the distal end thereof. A flexible tube having an emitting end for emitting fluid and for flailing in response to such emission of fluid from the emitting end is supported by and in fluid communication with the fluid supply means. The cage means defines an opening surrounding the tube and in spaced relationship thereto for restricting the flailing movement of the tube to the confines of the opening. The cage means is positioned relative to the support means so as to direct the emitting end of the flailing tube toward a headlamp when the support means is connected to the vehicle body adjacent a headlamp thereof.

Other advantages of the present invention will be readily appreciated as the same becomes better understood by reference to the following detailed description when considered in connection with the accompanying drawings wherein:

FIG. 1 is a cross-sectional view taken substantially along a longitudinal center line of the assembly;

FIG. 2 is a view taken substantially along line 2—2 of FIG. 1 but including an adapter plate which FIG. 1 does not show;

FIG. 3 is a view taken substantially along line 3—3 of FIG. 1;

FIG. 4 is a fragmentary view partially broken away and in cross section of the side of the assembly at the rear end of the support portion thereof showing an adapter plate connected thereto for disposition between the assembly and a vehicle body; and FIG. 5 is a fragmentary cross-sectional view taken substantially along line 5—5 of FIG. 2.

An assembly constructed in accordance with the instant invention for directing a fluid such as a mixture of air and liquid toward a vehicle headlamp is generally shown at 10. A fragmentary portion of a vehicle headlamp is shown at 12.

The assembly includes a support means defined by the box member generally indicated at 14. The box member 14 is adapted at a first end or rear wall 16 to be connected to a vehicle body adjacent the headlamp 12 and extends forwardly to a second distal end or front wall 18 which is positioned forwardly of the headlamp 12. The box member 14 includes a bottom 20 and side walls 22 extending upwardly therefrom. The side walls 22 taper inwardly toward one another from the outward extremities of the rear wall 16 to a waist area 24 at which point the side walls 22 extend forwardly parallel to one another to the front wall 18. The box member 14 includes an intermediate wall 26 which has a U-shaped recess 28 therein, the purpose of which will become more clear hereinafter. There are also included triangular-shaped reinforcing ribs 30, all of which slant downwardly from the top toward the bottom 20 of the box member 14.

A fluid supply means extends through the box-like member 14 to the distal end 18 thereof. More specifically, the fluid supply means includes a fluid supply tube 32 and the elbow member generally indicated at 34. The rear wall 16 of the box member 14 has a circular opening 36 extending therethrough through which the supply tube 32 extends. The supply tube 32 also extends through the U-shaped recess 29 in the wall 26 and since the recess 28 is open at the top the supply tube may be inserted or laid therein. The supply tube 32 is connected to a circular inlet 38 of the elbow member 34.

The inlet 38 of the elbow 34 is the terminus of the inlet passage which extends into the elbow member 34 and the outlet 42 is the terminus of an outlet passage extending out of the elbow member 34. The outlet passage extends transversely to the inlet passage so as to be disposed at an acute angle relative thereto to extend upwardly and rearwardly relative to the inlet passage of the elbow member 34.

A flexible tube generally indicated at 40 is disposed over a circular outlet 42 out of the elbow member 34. The flexible tube 40 has an emitting end 44 for emitting fluid such as a mixture of air and liquid whereby the end 44 flails in response to the emission of the fluid therefrom. The lower end of the tube 40 is disposed over the outlet portion 42 of the elbow member 34 and includes an integral looped strap 46 extending downwardly therefrom and looped about the bottom of the elbow member 34 for retaining the tube 40 on the elbow member 34. The elbow member 34 includes a shoulder against which the looped strap 46 is disposed.

The assembly also includes a cage means defined by the cover member generally indicated at 48 extending from the distal forward end of the box member 14 and in a direction transverse to the longitudinal axis of the box member 14.

The cover member 48 is an integral member having a front face or wall 50 with a bottom flange 52 extending rearwardly from the front face 50 and a pair of side flanges 54 extending rearwardly from the front face 50 and joined to the bottom flange 52. The front face 50 extends or is inclined upwardly and rearwardly from the bottom flange 52 so that the side flanges 54 are wider at the bottom than at the top. Thus, the cover member 48 has an open rear and open top. Near the top of the cover member 50 is a caged wall generally indicated at 56 having side portions 58 extending rearwardly from the inside of the side walls 54 thereof and inclined inwardly toward one another and a portion 60 generally parallel to the front face 50 to define an opening in which the flailing tube 40 is disposed. The opening defined by the front face 50, the side flanges 54 and the caged wall 56 is generally funnel-shaped with straight flanges 62 at the bottom thereof to prevent the definition of sharp edges against which the flailing tube 40 could abut.

The flailing tube 40 includes an annular skirt 64 and the front face 50 of the cover member 48 includes a retaining projection 66 which abuts the skirt 64 to aid in retaining the flailing tube 40 in position.

The front wall 18 of the box member 14 has an aperture or opening therein so that the wall 18 actually forms retaining flanges. The elbow member 34 has integral support flanges 68 extending laterally in opposite directions and disposed within the box member 14 to engage the retaining flanges 18. The inlet 38 to the elbow member 34 is recessed thereinto from the support flanges 68 and, therefore, side walls 70 extend forwardly from the flanges 68 to define the recess.

A biasing means comprising the coil spring 72 is disposed within the box member 14 for reacting between the intermediate wall 26 of the box 14 and the support flanges 68 of the elbow member 34 for urging the support flanges 68 against the retaining flanges 18 while allowing the elbow member 34 to move rearwardly to compress the spring 72 when force is applied thereto. The coil spring 72 is disposed about the supply tube 32 whereby the supply tube 32 extends through the longitudinal axis of the coil spring 72.

Each of the support flanges 68 has an aperture therein and a fastener clip 74 is disposed over each support flange with a thread receiving aperture therein aligned with the aperture in the support flange. The cover member 48 includes a pair of extensions 76 extending rearwardly from the front face 50 with their terminal ends engaging the support flanges 68 through the metal clip 74. The extensions 76 have bores therethrough and a pair of threaded fasteners 78 extend through the front face 50 of the cover member 48 and through the bores of the extension 76 to threadedly engage the metal clips 74 for connecting the cover member 48 to the elbow member 34. Thus, both the elbow member 34 and the cover member 48 are resiliently connected to the box member 14 defining the support means for movement towards a vehicle body in response to a force applied to the cover member 48 as the spring 72 may be compressed. Upon release of that force the spring 72 will move the elbow member forwardly until the support flanges 68 thereof engage the retaining flanges 18.

As will be appreciated, the cover means is positioned relative to the box member 14 so as to direct the emitting end 44 of the flailing tube 40 toward the headlamp 12 when the box member 14 is connected to a vehicle body to extend therefrom adjacent the headlight 12.

The cover member also includes support ridges 80 extending upwardly from the bottom flange 52 thereof to engage the bottom of the box member 14 for guiding the movement of the cover member 48 rearwardly relative to the box member 14.

The rear wall 16 of the box member 14 includes a rectangular opening on each side of the opening 36 through which a metal clip 82, as shown in FIG. 2, may be inserted to engage the rear wall 16 over another aperture in the rear wall for receiving a threaded fastener screw which threadedly engages the clip 82. The rear face of the wall 16 is recessed for receiving the metal clip so that the metal clip is flush with the rear surface of the wall 16. The rear surface of the wall 16 may abut a vehicle body if the vehicle body is planar. However, different vehicle bodies have different curved configurations and, therefore, the assembly includes an adapter plate 84 for disposition between the rear walls 16 of the box member 14 and a vehicle body. The adapter plate 84 accommodates the contour of the vehicle body whereby the box member 14 defining the support means of the assembly may be connected to various different vehicle body contours by utilizing any one of various different adapter plates having an appropriate rearwardly facing configuraton or contour. This may be accomplished by extending the threaded fasteners through the vehicle body, through apertures (not shown) in the adapter plate and into threaded engagement with the clips 82.

The supply tube 32 is connected to a supply of fluid such as a mixture of air and water under pressure which flows through the supply tube 32 into the inlet 38 of the elbow member 34 and through a turn of an acute angle into the outlet passage and out the outlet 42 of the elbow member 34 and into the flailing tube 40. As the fluid is emitted from the emitting end 44 of the flailing tube 40, the flailing tube 40 randomly flails within the confines of the opening defined by the cover member 48 and the cage wall 56 so as to direct the mixture onto the surface of the headlamp 12, thereby cleaning the surface of the headlamp 12.

In the event the flailing tube 40 must be replaced, the cover member 48 may be easily removed by removing the threaded screws 78 and replaced with a new flailing tube. In the event a force is applied to the cover member 48 in a rearward direction, the cover member 48, along with the elbow member 34, will move rearwardly to compress the spring 72. When such a force is removed, the spring 72 will return the cover member 48 and the elbow member 34 to the position shown in FIG. 1 with the support flanges 68 of the elbow member 34 engaging the retaining flanges 18 defined by the front wall of the box member 14.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An assembly for directing fluid toward a surface comprising: a support portion adapted at a first end to be supported by structure and extending to a second end, a cage portion extending from said second end and in a direction transverse to said support portion, a flexible tube having an emitting end for emittting fluid and for flailing in response to such emission of fluid from said emitting end, said cage portion defining an opening surrounding said tube and in spaced relationship thereto for restricting the flailing movement of said tube to the confines of said opening, an integral elbow member supported by one of said portions and having an inlet passage and an outlet passage extending transversely thereto, said tube being in fluid communication with said outlet passage, said elbow member including support flanges extending laterally therefrom with each support flange having an aperture therein, a fastener clip disposed over each support flange with a thread-receiving aperture therein and aligned with said aperture in said support flange, and fastening means associated with said clips for securing said elbow member in position.

2. An assembly as set forth in claim 1 wherein said tube includes a looped strap extending therefrom and about said elbow member for retaining said tube in fluid communication with said elbow member.

3. An assembly for directing fluid toward a vehicle headlamp comprising; support means adapted at a first end to be connected to a vehicle body adjacent the headlamp thereof and extending to a second distal end to be positioned forwardly of the headlamp, cage means extending from said distal end and in a direction transverse to said support means, fluid supply means extending through said support means to said distal end thereof, a flexible tube having an emitting end for emitting fluid and for flailing in response to such emission of fluid from said emitting end, said cage means defining an opening surrounding said tube and in spaced relationship thereto for restricting the flailing movement of said tube to the confines of said opening, said tube being supported by and in fluid communication with said fluid supply means, said cage means being positioned relative to said support means so as to direct said emitting end toward a headlamp when said support means is connected to the vehicle body to extend therefrom adjacent the headlamp thereof, said tube including a looped strap extending therefrom and about said fluid supply means for retaining said tube connected to said fluid supply means.

4. An assembly as set forth in claim 3 wherein said fluid supply means includes an elbow member having an inlet passage and and outlet passage extending transversely thereto, said tube being in fluid communication with said outlet passage.

5. An assembly as set forth in claim 4 wherein said cage means is connected to said elbow member and both are resiliently connected to said support means for movement toward the vehicle body in response to a force applied thereto.

6. An assembly as set forth in claim 4 wherein said cage means comprises an integral cover member having a front face, a bottom flange extending rearwardly from said front face and a pair of side flanges extending rearwardly from said front face and joined to said bottom flange, said front face inclined upwardly and rearwardly from said bottom flange whereby said side flanges are wider at the bottom than at the top, said cover member having an open rear and an open top, a cage wall extending rearwardly from the inside of said side walls adjacent the top thereof and parallel to said front face to define said opening in which said tube is disposed.

7. An assembly as set forth in claim 6 wherein said opening defined by said front face, said side flanges and said cage wall is generally funnel-shaped.

8. An assembly as set forth in claim 7 wherein said support means comprises a hollow box member, said distal end including a front wall with an aperture therein to define retaining flanges, said elbow member having support flanges extending laterally therefrom and disposed within said box member to engage said retaining flanges, said cover member being connected to said support flanges.

9. An assembly as set forth in claim 8 including biasing means disposed within said box member for reacting between said box member and said elbow member for urging said support flanges thereof against said retaining flanges and for allowing said elbow member and said cover member to move rearwardly in response to a force applied thereto.

10. An assembly as set forth in claim 9 wherein said biasing means comprises a coil spring, said fluid supply means includes a supply tube extending through said box member and connected to said inlet of said elbow member, said spring being disposed about said supply tube.

11. An assembly as set forth in claim 10 wherein each of said support flanges of said elbow member has an aperture therein, a fastener clip disposed over each support flange with a thread receiving aperture therein aligned with said aperture in said support flange, said cover member having a pair of extensions extending rearwardly from said front face and engaging said elbow member, said extensions having bores extending therethrough, a pair of threaded fasteners extending through said front face of said cover member and through said bores of said extensions and threadedly engaging said clips for connecting said cover member to said elbow member.

* * * * *